United States Patent [19]
Yamaguchi et al.

[11] Patent Number: 5,982,463
[45] Date of Patent: Nov. 9, 1999

[54] LIQUID CRYSTAL DISPLAY DEVICE CAPABLE OF DISPLAYING COLOR WITHOUT A COLOR FILTER

[75] Inventors: Hisanori Yamaguchi; Hiroaki Mizuno; Shingo Fujita; Tetsu Ogawa, all of Ishikawa, Japan

[73] Assignee: Matsushita Electric Industrial Co., Ltd., Osaka, Japan

[21] Appl. No.: 08/934,874

[22] Filed: Sep. 22, 1997

[30] Foreign Application Priority Data

Sep. 25, 1996 [JP] Japan .................................. 8-252595

[51] Int. Cl.⁶ .................................................. G02F 1/1335
[52] U.S. Cl. ........................... 349/99; 349/106; 349/102; 349/119
[58] Field of Search ............................... 349/106, 117, 349/119, 99, 101, 102

[56] References Cited

U.S. PATENT DOCUMENTS

| | | | |
|---|---|---|---|
| 4,852,976 | 8/1989 | Suzuki | 349/119 |
| 4,909,606 | 3/1990 | Wada et al. | 349/117 |
| 4,973,137 | 11/1990 | Kozaki | 349/119 |
| 4,984,873 | 1/1991 | Takiguchi et al. | 349/101 |
| 5,016,988 | 5/1991 | Iimura | 350/347 |
| 5,089,906 | 2/1992 | Ohnishi et al. | 359/73 |
| 5,175,638 | 12/1992 | Kanemoto et al. | 359/73 |
| 5,235,450 | 8/1993 | Yoshimura et al. | 349/120 |
| 5,337,174 | 8/1994 | Wada et al. | 359/73 |
| 5,380,459 | 1/1995 | Kanemoto et al. | 252/299.01 |
| 5,587,821 | 12/1996 | Nakanishi et al. | 349/118 |
| 5,680,184 | 10/1997 | Nishino | 349/118 |
| 5,699,137 | 12/1997 | Kishimoto | 349/99 |

FOREIGN PATENT DOCUMENTS

| | | |
|---|---|---|
| 6-167691 | 6/1994 | Japan . |
| 6-175125 | 6/1994 | Japan . |
| 6-301006 | 10/1994 | Japan . |
| 6-308481 | 11/1994 | Japan . |
| 8-015691 | 1/1996 | Japan . |
| 8-152618 | 6/1996 | Japan . |

*Primary Examiner*—William L. Sikes
*Assistant Examiner*—Tarifur R. Chowdhury
*Attorney, Agent, or Firm*—Merchant & Gould P.C.

[57] ABSTRACT

A color liquid crystal display device comprises a liquid crystal cell and a polymer film. The liquid crystal cell comprises a liquid crystal layer positioned between a pair of transparent substrates, on whose innersides transparent electrodes are provided. The polymer film is positioned at one side of the liquid crystal cell. The liquid crystal layer and the polymer film are sandwiched by a pair of polarization films. A twist angle of the liquid crystal layer is set to be a predetermined value. The product of birefringence of the nematic liquid crystal, $\Delta n_{LC}$, and a thickness of liquid crystal layer, $d_{LC}$, $\Delta n_{LC} \cdot d_{LC}$ is set to be a predetermined value. The birefringence difference $\Delta(R) = R_{Film} - \Delta n_{LC} \cdot d_{LC}$, which is defined by using the $\Delta n_{LC} \cdot d_{LC}$ and retardation of the polymer film, $R_{Film}$, is set to be a value between 0.0 μm and 0.1 μm. The present color liquid crystal device can express a black and white display in achromatic color having bright white and with high contrast, and a red display with high color purity.

7 Claims, 8 Drawing Sheets

LIQUID CRYSTAL DISPLAY DEVICE CAPABLE OF DISPLAYING COLOR WITHOUT A COLOR FILTER

FIELD OF THE INVENTION

The present invention relates to a color liquid crystal display device.

BACKGROUND OF THE INVENTION

A conventional type of color liquid crystal display device, by which a colored display is obtained, comprises a liquid crystal cell having a color filter and a pair of polarization films by which the liquid crystal cell is sandwiched. In this case, the color filter is provided on one of the substrates of the liquid crystal cell, and a transparent electrode is formed on the color filter provided on the substrate. A voltage is applied to the liquid crystal cell to change the orientation of liquid crystal molecule. Accordingly, the transmissivity of each color filter is changed so as to express color display.

A color liquid crystal display apparatus in which color display is expressed by using birefringence of a twist orientation nematic liquid crystal layer and polarization film, without using a color filter, has been disclosed in Japanese Laid-Open Patent Publication No.6-308481. A color liquid crystal display apparatus in which birefringence of liquid crystal layer and phase difference film is used has been disclosed in Japanese Laid-Open Patent Publication No.6-175125 and No.6-301006.

However, in the color liquid crystal display device having a color filter, colored light is obtained by obsorbing light having a specific wavelength with the color filter. Therefore, transmissivity is lowered and as a result the display becomes dark.

In the color liquid crystal display apparatus in which colored display is expressed by using birefringence of liquid crystal layer and polarization film (disclosed in Japanese Laid-Open Patent Publication No.6-308481), white is colored. Thus it is difficult to express a black display in achromatic color, the number of colors to be displayed is few and color purity becomes low.

In the color liquid crystal display apparatus in which a liquid crystal layer and phase difference film are used (disclosed in Japanese Laid-Open Patent Publication No.6-175125 and No.6-301006), it is difficult to express a black and white display that is close to achromatic color.

SUMMARY OF THE INVENTION

In order to solve the above-mentioned problems in the prior art, it is an object of the present invention to provide a color liquid crystal display device that can express a colored display without using a color filter and express a black and white display in achromatic color having bright white and high contrast display, and express a red display with high color purity.

To accomplish the above-mentioned object, a color liquid crystal display device of the present invention is constructed as follows. A color liquid crystal display device according to a first embodiment of the present invention comprises a liquid crystal cell, a polymer film and a pair of polarization films. The liquid crystal cell comprises nematic liquid crystal filled between a pair of transparent substrates on whose inner sides transparent electrodes are provided. Further, the polymer film is positioned on one side of the liquid crystal cell and a pair of polarization films are positioned on both sides, by which the liquid crystal cell and the polymer film are sandwiched. The twist angle of the nematic liquid crystal is selected to be between 220° and 260°, The product of the birefringence of the nematic liquid crystal $\Delta n_{LC}$ and the thickness of the liquid crystal layer $d_{LC}$, $\Delta n_{LC} \cdot d_{LC}$, is determined between 1.2 $\mu$m and 2.2 $\mu$m. When an extraordinary index of refraction of the inside of the polymer film is designated as $n_x$, an ordinary index of refraction of the inside of the polymer film is designated as $n_y$ and a thickness of the polymer film is designated as $d_{Film}$, the retardation of the polymer film, designated as $R_{Film}$ is obtained by following formula: $R_{Film}=(n_x-n_y) \cdot d_{Film}$. The birefringence difference, $\Delta(R)=R_{Film}-\Delta n_{LC} \cdot d_{LC}$, which is obtained by using retardation of the polymer film, $R_{Film}=(n_x-n_y) \cdot d_{Film}$, and $\Delta n_{LC} \cdot d_{LC}$ is between 0.0 $\mu$m and 0.1 $\mu$m. According to the first embodiment of the color liquid crystal display device, a color liquid crystal display device which can express a black and white display in achromatic color and a red display with high color purity is obtained.

In the first embodiment of the color liquid crystal display device according to the present invention, when a color liquid crystal display device is seen from the top, which is the side on which a polymer film is positioned, the twist direction of the liquid crystal is designated as the positive direction of rotation, and an angle is measured using the horizontal direction as a standard. When the absorption axis direction of the polarization film positioned on the lower side is designated as $\phi_{p1}$, the angle of the direction of the liquid crystal molecule on the transparent substrate positioned on the lower side is designated as $\phi_{LC1}$, the angle of the direction of the liquid crystal molecule on the transparent substrate positioned on the upper side is designated as $\phi_{LC2}$, the angle of the direction of the retardation axis (the direction of extraordinary index of refraction) of the polymer film is designated as $\phi_F$ and the angle of the adsorption axis direction of the polarization film positioned on the upper side is designated as $\phi_{p2}$, $\phi_{LC1}-\phi_{p1}$ satisfies ±45° ±10°, $\phi_F-\phi_{LC2}$ satisfies 90° ±10° and $\phi_{p2}-\phi_F$ satisfies ±45° ±10°. According to this preferable example, color purity and efficiency for light utilization can be increased.

A color liquid crystal display device according to a second embodiment of the present invention comprises a liquid crystal cell, two polymer films and a pair of polarization films. The liquid crystal cell comprises nematic liquid crystal filled between a pair of transparent substrates on whose inner sides transparent electrodes are provided. These two polymer films are positioned on one side of the liquid crystal cell and a pair of polarization films are positioned on both sides, by which the liquid crystal cell and the polymer films are sandwiched. The twist angle of the nematic liquid crystal is determined between 220° and 260°. The product of the birefringence of the nematic liquid crystal $\Delta n_{LC}$ and a thickness of liquid crystal layer $d_{LC}$, $n_{LC} \cdot d_{LC}$, is between 1.2 $\mu$m and 2.2 $\mu$m. The one of these polymer films positioned closer to the liquid crystal cell is designated as 1 and the other one is designated as 2. When an extraordinary index of refraction of the inside of each polymer film is designated as $n_x(i)$ (i=1,2), an ordinary index of refraction of inside of each polymer film is designated as $n_y$ (i)(i=1,2), and a thickness of each polymer film is designated as $d_{Film}$ (i)(i=1,2), the retardation of each polymer film, designated as $R_{Film}(i)$ is obtained by following formula: $R_{Film}(i)=(n_x(i)-n_y(i)) \cdot d_{Film}(i)$ (i=1,2). The birefringence difference, $\Delta(R)=(R_{Film}(1)+R_{Film}(2))-\Delta n_{LC} \cdot d_{LC}$, which is obtained by using the retardation of the film $(R_{Film}(i)=(n_x(i)-n_y(i)) \cdot d_{Film}(i)$ (i=1,2)) and $\Delta n_{LC} \cdot d_{LC}$, is between 0.0 $\mu$m and 0.1 $\mu$m. According to the second embodiment of the color liquid crystal display device, a color liquid crystal display device which can express a black and white display in achromatic color and a red display with high color purity is obtained.

In the second constitution of the colour liquid crystal display device according to the present invention, when a color liquid crystal display device is seen from the top, which is the side on which these two polymer films are positioned, it is preferable that the twist direction of the liquid crystal is designated as the positive direction of rotation, and an angle is measured using the horizontal direction as a standard. When the angle of the absorption axis direction of the polarization film positioned on the under side is designated as $\phi_{p1}$, the angle of the direction of the liquid crystal molecule on the transparent substrate positioned on the lower side is designated as $\phi_{Lc1}$, the angle of the direction of the liquid crystal molecule on the transparent substrate positioned on the upper side is designated as $\phi_{Lc2}$, the angle of the direction of retardation axis (the direction of extraordinary index of refraction) of the polymer film which is positioned on the side of the liquid crystal cell is designated as $\phi_{F1}$, the angle of the direction of retardation axis (the direction of extraordinary index of refraction) of the polymer film which is positioned on the side of the polarization film positioned on the upper side is designated as $\phi_{F2}$ and the angle of the direction of the absorption axis of the polarization film positioned on the upper side is designated as $\phi_{p2}$, $\phi_{Lc1}-\phi_{p1}$ satisfies ±45° ±10°, $\phi_{F1}-\phi_{Lc2}$ satisfies 90° ±10°, $\phi_{F2}-\phi_{F1}$ satisfies 0° ±25° and $\phi_{p2}-\phi_{F2}$ satisfies ±45° ±10°, According to this preferable example, color purity and efficiency of light utilization can be increased.

A color liquid crystal display device according to a third embodiment of the present invention comprises a liquid crystal cell, two polymer films and a pair of polarization films. The liquid crystal cell comprises nematic liquid crystal which is filled between a pair of transparent substrates on whose inner sides, transparent electrodes are provided. These two polymer films are positioned on one side of the liquid crystal cell and a pair of polarization films are positioned on both sides, by which the liquid crystal cell and the polymer films are sandwiched. The twist angle of the nematic liquid crystal is between 220° and 260°. The product of the birefringence of the nematic liquid crystal $\Delta n_{LC}$ and a thickness of liquid crystal layer $d_{LC}$, $\Delta n_{LC} \cdot d_{LC}$, is between 1.2 μm and 2.2 μm. The one of these polymer films positioned closer to the liquid crystal cell is designated as 1 and the other one is designated as 2. When an extraordinary index of refraction of inside of each polymer film is designated as $n_x(i)(i=1,2)$, an ordinary index of refraction of inside of each polymer film is designated as $n_y(i)(i=1,2)$, and a thickness of each film is designated as $d_{Film}(i)(i=1,2)$, the retardation of each polymer film designated as $R_{Film}(i)$ is obtained by following formula: $R_{Film}(i)=(n_x(i)-n_y(i))\cdot d_{Film}(i)$ (i=1,2). The birefringence difference, $\Delta(R)=R_{Film}(1)+R_{Film}(2)-\Delta n_{LC}\cdot d_{LC}$, which is obtained by using the retardation of the film ($R_{Film}(i)=(n_x(i)-n_y(i))\cdot d_{Film}(i)$ (i=1,2) and $\Delta n_{LC}\cdot d_{LC}$, is between −0.1 μm and −0.2 μm. According to the third embodiment of color liquid crystal display device according to the present invention, a color liquid crystal display device that can express a black and white display in achromatic color and a red display with high color purity is obtained.

In the third embodiment of the color liquid crystal display device according to the present invention, when a color liquid crystal display device is seen from the top, which is the side on which these two polymer films are positioned, the twist direction of the liquid crystal is designated as the positive direction of rotation, and an angle is measured using the horizontal direction as a standard. When the angle of the absorption axis direction of the polarization film positioned on the lower side is designated as $\phi_{p1}$, the angle of the direction of the liquid crystal molecule on the transparent substrate positioned on the lower side is designated as $\phi_{Lc1}$, the angle of the direction of liquid crystal molecule on the transparent substrate positioned on the upper side is designated as $\phi_{Lc2}$, the angle of the direction of the retardation axis (the direction of extraordinary index of refraction) of the polymer film which is positioned on the side of the liquid crystal cell is designated as $\phi_{F1}$, the angle of the direction of the retardation axis (the direction of extraordinary index of refraction) of the polymer film which is positioned on the side of the polarization film positioned on the upper side is designated as $\phi_{F2}$ and the angle of the direction of the adsorption axis of the polarization film positioned on the upper side is designated as $\phi_{p2}$, $\phi_{Lc1}-\phi_{p1}$ satisfies ±45° ±10°, $\phi_{F1}-\phi_{Lc2}$ satisfies 90° ±10°, $\phi_{F2}-\phi_{F1}$ satisfies 0° ±25° and $\phi_{p2}-\phi_{F2}$ satisfies ±45° ±10°. According to this preferable example, color purity and efficiency for light utilization can be increased.

A color liquid crystal display device according to a fourth embodiment of the present invention comprises a liquid crystal cell, two polymer films and a pair of polarization films. The liquid crystal cell comprises nematic liquid crystal which is filled between a pair of transparent substrates on whose inner sides, transparent electrodes are provided. These two polymer films are positioned on one side of the liquid crystal cell and a pair of polarization films are positioned on both sides, by which the liquid crystal cell and the polymer films are sandwiched. The twist angle of the nematic liquid crystal is between 220° and 260°. The product of the birefringence of the nematic liquid crystal $\Delta n_{LC}$ and a thickness of liquid crystal layer $d_{Lc}$, $\Delta n_{LC}\cdot d_{LC}$ is between 1.2 μm and 2.2 μm. The one of these polymer films positioned closer to the liquid crystal cell is designated as 1 and the other one is designated as 2. When an extraordinary index of refraction of the inside of each polymer film is designated as $n_x(i)(i=1,2)$, an ordinary index of the refraction of inside of each polymer film is designated as $n_y(i)(i=1,2)$, and a thickness of each polymer film is designated as $d_{Film}(i)$ (i=1,2), the retardation of each polymer film, designated as $R_{Film}(i)$ is obtained by following formula: $R_{Film}(i)=(n_x(i)-n_y(i))\cdot d_{Film}(i)$ (i=1,2). The birefringence difference, $\Delta(R)=(R_{Film}(1)+R_{Film}(2))-\Delta n_{LC}\cdot d_{LC}$, which is obtained by using retardation of each film, $(R_{Film}(i)=(n_x(i)-n_y(i))\cdot d_{Film}(i)$ (i=1,2)) and $\Delta n_{LC}\cdot d_{LC}$, is between 0.5 μm and 1.0 μm. According to the fourth embodiment of the color liquid crystal display device, a color liquid crystal display device that can express a black and white display in achromatic color and a red display with high colour purity is obtained.

In the fourth embodiment of the colour liquid crystal display device according to the present invention, when a color liquid crystal display device is seen from the top, which is the side on which these two polymer films are positioned, the twist direction of the liquid crystal is designated as the positive direction of rotation, and an angle is measured using the horizontal direction as a standard. When the angle of the absorption axis direction of the polarization film positioned on the lower side is designated as $\phi_{p1}$, the angle of the direction of the liquid crystal molecule on the transparent substrate positioned on the lower side is designated as $\phi_{Lc1}$, the angle of the direction of the liquid crystal molecule on the transparent substrate positioned on the upper side is designated as $\phi_{Lc2}$, the angle of the direction of the retardation axis (the direction of the extraordinary index of refraction) of the polymer film which is positioned on the side of the liquid crystal cell is designated as $\phi_{F1}$, the angle of the direction of the retardation axis (the direction of the extraordinary index of refraction) of the polymer film which is positioned on the side of the polarization film positioned on the upper side is designated as $\phi_{F2}$ and the angle of the direction of the adsorption axis of the polarization film positioned on the upper side is designated as $\phi_{p2}$, $\phi_{Lc1}-\phi_{p1}$ satisfies ±45° ±10°, $\phi_{F1}-_{Lc2}$ satisfies 90° ±10° and $\phi_{F2}-\phi_{F1}$ satisfies ±45° ±25°. According to this preferable example, the color purity and efficiency for light utilization can be increased.

In the fourth embodiment of the color liquid crystal display device according to the present invention, it is preferable that $\Delta(R)$ satisfies a range between 0.55 μm and 0.65 μm, $\Delta n_{LC} \cdot d_{LC}$ satisfies a range between 1.8 μm and 2.0 μm, $R_{Film}(1)$ satisfies 1.7 μm ±0.1 μm and $R_{Film}(2)$ satisfies 0.75 μm ±0.1 μm. According to this preferable example, a bright white display can be obtained by increasing the color purity, especially color purity of red, and the efficiency for light utilization.

In the first, second, third and fourth embodiments of the color liquid crystal display device according to the present invention, it is preferable that the twist angle of the nematic liquid crystal is between 240° and 260° and $\Delta n_{LC} \cdot d_{LC}$ is between 1.5 μm and 2.2 μm. According to the preferable example, a sufficient sharp response can be secured, and therefore a bright white display and a red display with high color purity can be obtained even with a duty ratio of less than 1/200.

In the first, second, third and fourth embodiments of the color liquid crystal display device according to the present invention, it is preferable that a polymer film is selected from a group consisting of polycarbonate, polyalylate and polysulphone.

In the first, second, third and fourth embodiments of the color liquid crystal display device according to the present invention, it is preferable that a polymer film in which Z coefficient $Q_z=(n_x-n_z)/(n_x-n_y)$ satisfies a range between 0.1 and 0.8 which is defined by using $n_z$ which is an index of refraction, perpendicular to the surface of the polymer film. This preferable example of color liquid crystal display device according to the present invention has less contrast change, reflection change and colour change in comparison with the ordinary type of color liquid crystal display device having coefficient $Q_z=1.0$ ($n_x=n_y$), and therefore, has a preferable optical property.

In the first, second, third and fourth embodiments of the color liquid crystal device according to the present invention, it is preferable that a reflector may be provided on the outside of either one of the polarization films. According to this preferable example, a back light module is not required and the structure becomes simple.

DETAILED DESCRIPTION OF THE INVENTION

Figure 1:
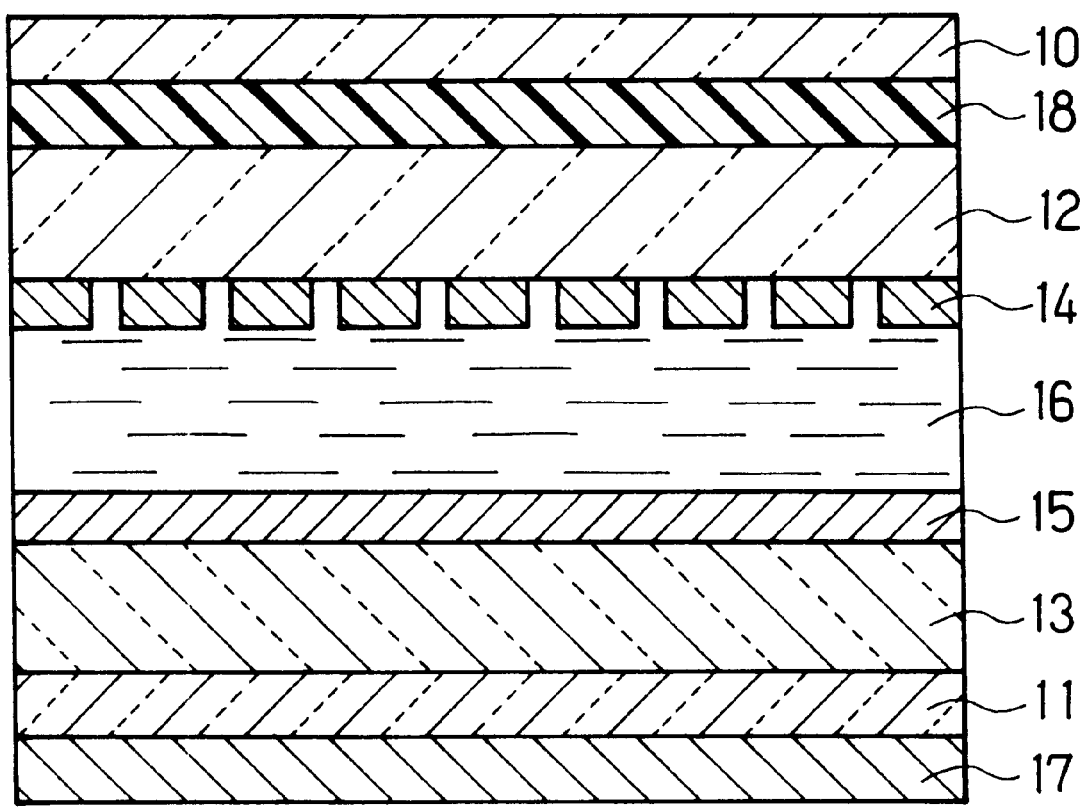
FIG. 1 is a sectional view showing a color liquid crystal display device in a first embodiment of the present invention.

Hereinafter, the details of the present invention will be explained referring to the drawings.

(A First Embodiment)

FIG. 1 is a sectional view showing a color liquid crystal display device of a first embodiment of the present invention. As shown in FIG. 1, a plurality of stripe-shaped transparent electrodes 14 are formed parallel to each other and with a predetermined space therebetween on a transparent substrate 12. Further, a plurality of stripe-shaped transparent electrodes 15 are formed parallel to each other and with a predetermined space therebetween on a transparent substrate 13. The transparent substrates 12 and 13 are arranged parallel to each other with the transparent electrodes 14 and 15 facing each other. In this case, the transparent electrode 14 and 15 are arranged to form a matrix. A liquid crystal layer 16 is formed between the transparent substrate 12 with which the transparent electrode 14 is formed and the transparent substrate 13 with which the transparent electrode 15 is formed. A polymer film 18 is formed on the transparent substrate 12 at the side opposite to the side where the transparent electrode 14 is formed. Further, a polarization film 10 is formed on the polymer film 18. A polarization film 11 is formed on the transparent substrate 13 at the side opposite to the side where the transparent electrode 15 is formed. Further, a reflector 17 is formed on the polarization film 11.

Figure 2:
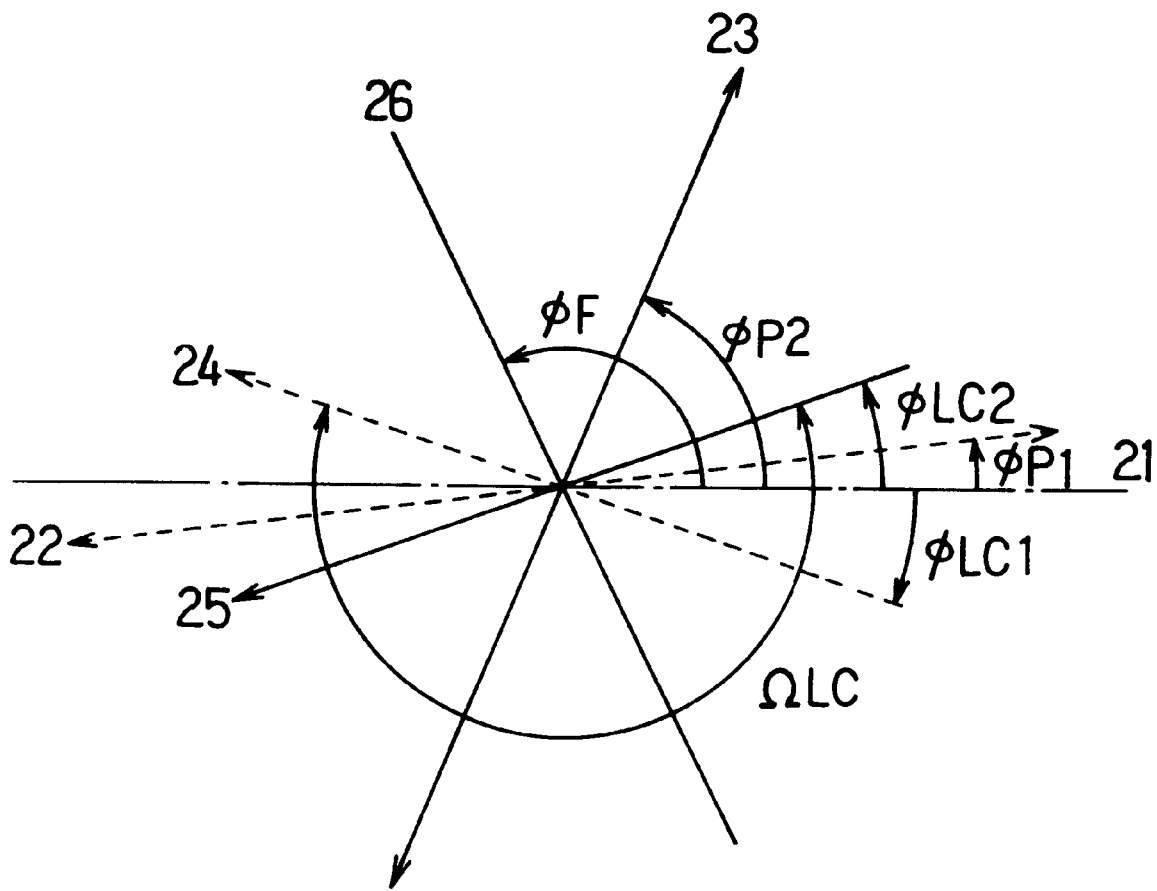
FIG. 2 is a view illustrating the optical properties of a color liquid crystal device in a first embodiment of the present invention.

FIG. 2 illustrates the optical properties of a color liquid crystal display device of a first embodiment of the present invention. In FIG.2, 21 indicates a base line, 22 indicates the absorption axis direction of the polarization film 11 positioned at the lower side, 23 indicates the absorption axis direction of the polarization film 10 positioned at the upper side, 24 indicates orientation direction of the liquid crystal molecule on the transparent substrate 13 positioned at the lower side, 25 indicates the orientation direction of the liquid crystal molecule on the transparent substrate 12 positioned at the upper side and 26 indicates the retardation axis direction (the direction of extraordinary refractive index) of the polymer film 18. $\phi_{P1}$ indicates the angle between the absorption axis direction 22 of the polarization film 11 positioned at the lower side and the base line 21 when the twist direction of the liquid crystal is positive. $\phi_{P2}$ indicates the angle between the absorption axis direction 23 of the polarization film 10 positioned at the upper side of a transparent substrate and the base line 21 when the twist direction of the liquid crystal is positive. $\phi_{LC1}$ indicates the angle between the orientation direction 24 of the liquid crystal molecule on the transparent substrate 13 positioned at the lower side and the base line 21 when the twist direction of the liquid crystal is positive. $\phi_{LC2}$ indicates the angle between the orientation direction 25 of the liquid crystal molecule on the transparent substrate 12 positioned at the upper side and the base line 21 when the twist direction of respective liquid crystal is positive. $\phi_F$ indicates the angle between the retardation axis direction 26 of a polymer film 18 and the base line 21 when the twist direction of the liquid crystal is positive. $\Omega_{LC}$ indicates the twist direction and twist angle of the liquid crystal.

Next, a method of manufacturing a color liquid crystal display device having the above-mentioned construction will be explained.

5 wt % polyimide solution (the solvent is N-methyl-2-pyrrolidine) is printed on a transparent substrates 12 and 13 (glass substrate) on which stripe-shaped transparent electrodes 14 and 15 composed of oxide of indium and tin are formed respectively. Then the polyimide solution is hardened at 200° C. and orientation treatment is carried out by the rotation rubbing method using rayon cloth to obtain a predetermined twist angle.

Next, a thermo-setting seal resin containing 1.0 wt % of glass fiber having a predetermined diameter is printed on the periphery of the top surface of the transparent substrate 12 and resin beads having a predetermined diameter are spread on the transparent substrate 13 at a ratio of 150 pieces/mm². The transparent substrates 12 and 13 are adhered together so as to form a matrix configuration with stripe-shaped transparent electrodes 14 and 15, and then the seal resin is hardened at 150° C. to manufacture a cell container. In this case, the cell container has a filling portion for filling liquid crystal material. Next, air in the cell container is evacuated while the liquid crystal material is deaerated. Then liquid crystal, which is obtained by mixing a predetermined chiral liquid crystal with tolane nematic liquid crystal having a birefringence $\Delta n_{LC}$=0.25, is filled in the cell container, that is, the space between the transparent substrates 12 and 13. Then, the filling portion of the cell container is sealed with ultraviolet ray hardening resin, and the ultraviolet ray hardening resin is hardened by irradiation with ultraviolet ray.

Next, polycarbonate as a polymer film 18 is adhered to the surface of the transparent substrate 12 opposite to the surface where the transparent electrode 14 is formed, and then a neutral gray polarization film (for example, NPF-F1025DU manufactured by NITT0 DENKO (K.K.)) is adhered as a polarization film 10 to the polymer film 18. Lastly, a neutral gray polarization film (for example, NPF-F1025DU manufactured by NITTO DENKO (K.K.)) is sticked as a polarization film 11 to the surface of the transparent substrate 13 opposite to the surface where the transparent electrode 15 is formed. Then a diffusion type aluminum reflector is adhered as a reflector 17 to the polarization film 11. According to the above-mentioned procedure, a reflective type of color liquid crystal display device was obtained.

The values of the display device are set as follows. $\phi_{P1}$=10°, $\phi_{LC1}$=-35°, $\phi_{LC2}$=35°, $\Omega_{LC}$=250°, $\phi_F$=125°, and $\phi_{P2}$=80°. $\Delta n_{LC}$ indicates the birefringence of nematic liquid crystal, $d_{LC}$ indicates the thickness of liquid crystal layer 16, $n_x$ indicates the extraordinary refractive index of polymer film 18, $n_y$ indicates the ordinary refractive index of polymer film 18, $d_{Film}$ indicates the thickness of polymer film 18, $R_{Film}$ indicates the retardation of polymer film 18 and $\Delta(R)$ indicates birefringence difference.

When an optical property of the reflective type of color liquid crystal display device is measured by changing $\Delta n_{LC} \cdot d_{LC}$ while the birefringence difference, $\Delta(R)=R_{Film}-\Delta n_{LC} \cdot d_{LC}$, satisfies 0.085 $\mu$m, a preferable black and white display and a preferable red display were obtained when $\Delta n_{LC} \cdot d_{LC}$ is in a range between 1.2 $\mu$m and 2.2 $\mu$m. This is due to the color display is changed by using a change of birefringence of liquid crystal layer 16. Therefore the color change from white to black, green and red can be conducted with high color purity by making the birefringence of the liquid crystal layer 16 more than a certain amount.

When the birefringence difference, $\Delta(R)$, satisfies a range between 0.0 $\mu$m and 0.1 $\mu$m, both of the white display and black display are achromatic color. When voltage is applied between transparent electrodes 14 and 15, it was confirmed that the display color is changed from white to black, green and red. This is due to the fact that when the birefringence difference, $\Delta(R)$, is in a range of between 0.0 $\mu$m and 0.1 $\mu$m, $\phi_F-\phi_{LC2}$ satisfies 90° ±10°, white can be changed to be black in achromatic color where the birefringence of liquid crystal layer 16 and polymer film 18 are cancelled when a voltage is changed in a range of low voltage.

When $\phi_{LC1}-\phi_{P1}$ and $\phi_{P2}-\phi_F$ satisfy ±45° ±10°, colour purity and efficiency for light utilization can be increased. This is due to the fact that when an angle between the direction of absorption axis 22 of the polarization film 11 positioned at the lower side and the orientation direction 24 of the liquid crystal molecule on the transparent substrate 13 positioned at the lower side or an angle between the direction of the absorption axis 23 of the polarization film 10 positioned at the upper side and the retardation axis direction 26 of the polymer film 18 is 0° or 90°, efficiency for light utilization becomes 0 and when the above-mentioned angle is 45°, efficiency for light utilization becomes maximum.

The twist angle of the liquid crystal affects the duty ratio, that is, the reciprocal of the possible number of selective electrodes to be used when a simple matrix color liquid crystal display device is driven. When the twist angle becomes larger and larger, the duty ratio can be reduced more and more, and as a result, the number of selective electrodes can be increased. Therefore, the number of pixel can be increased. In a first embodiment of the present invention, the display color is changed from white to black, green and red as the applied voltage increases. When the twist angle is in a range between 220° to 260°, it was confirmed that even a red display can be obtained by driving a color liquid crystal display device at a duty ratio less than 1/64.

When $\Delta n_{LC} \cdot d_{LC}$ is in a range between 1.5 $\mu$m and 2.0 $\mu$m, and the twist angle is in a range between 240° to 260°, it was confirmed that even red display can be obtained by driving a color liquid crystal display device at a duty ratio less than 1/200.

A result of measured optical property in which $n_{LC} \cdot d_{LC}$= 1.9 $\mu$m, $R_{Film}$=1.985 $\mu$m, $\phi_{P1}$=10°, $\phi_{LC1}$=-35°, $\phi_{LC2}$=35°, $\Omega_{LC}$=250°, $\phi_F$=125° and $\phi_{P2}$=80° is shown.

In this case, $\Delta(R)=R_{Film}-\Delta n_{LC} \cdot d_{LC}$=0.085 $\mu$m, $\phi_F-\phi_{LC2}$= 90°, $\phi_{LC1}-\phi_{P1}$=-45° and $\phi_{P2}-\phi_F$=-45°. Therefore, it satisfies the above-mentioned conditions.

Figure 3:
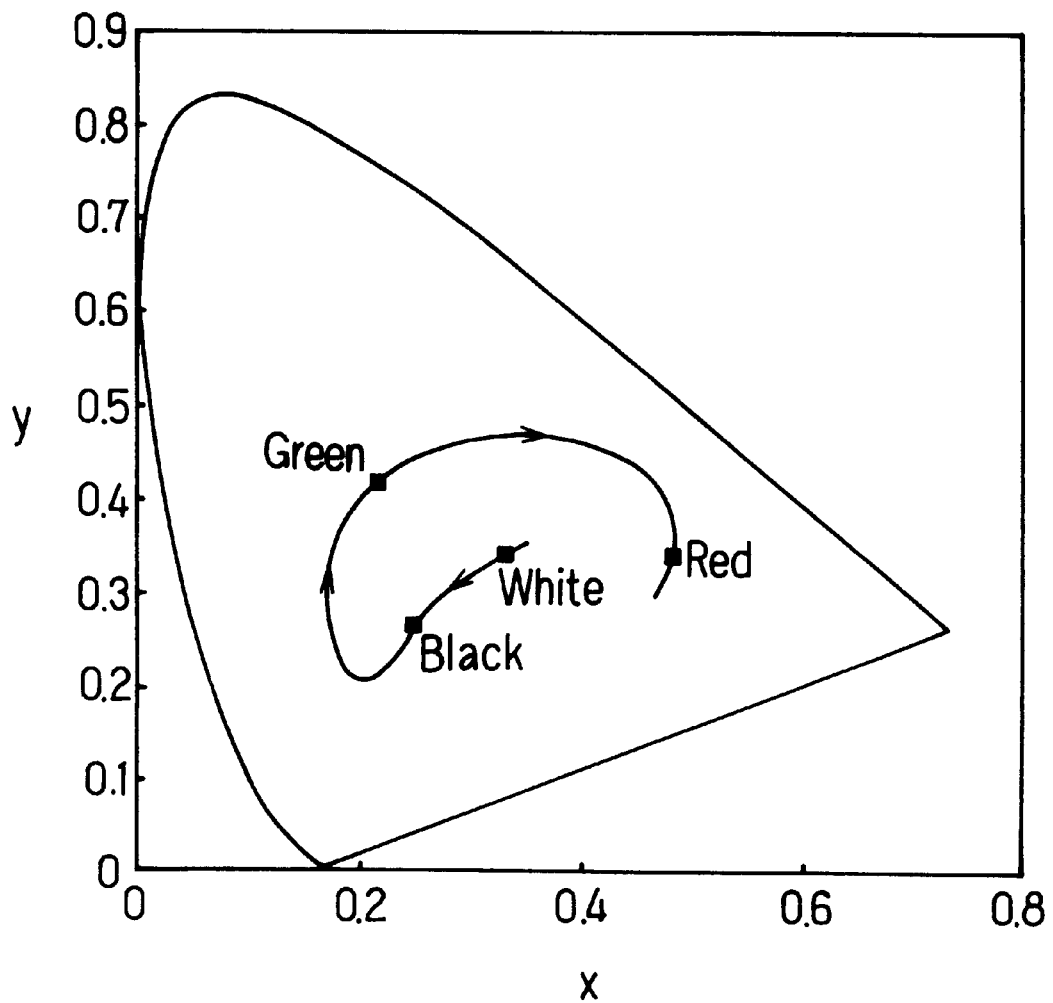
FIG. 3 is a chromaticity diagram showing a color change of a color liquid crystal display device in a first embodiment of the present invention.

In this case, it is possible to use a display color which changes from white to black, green and red by driving a color liquid crystal display device at a duty ratio of 1/240. FIG. 3 shows the transition of color change. In FIG. 3, the horizontal axis indicates x component of chromaticity coordinate and the vertical axis indicates y component of chromaticity coordinate. Table 1 in the below shows ratio of reflection of each display color and a value of xy chromaticity coordinates (CIE1931).

TABLE 1

| color | rate of reflection (%) | chromaticity coordinate x | chromaticity coordinate y | contrast white/black |
|---|---|---|---|---|
| white | 20.8 | 0.335 | 0.340 | 5.5 |
| black | 3.8 | 0.252 | 0.269 | — |
| green | 15.3 | 0.218 | 0.421 | — |
| red | 14.8 | 0.482 | 0.341 | — |

With the above-mentioned construction, it was confirmed that a reflective type color liquid crystal display device that can express a black and white display in achromatic color with contrast of 5 or more and a red display with high color purity can be obtained.

The values of the display device are set as follows. $\Delta n_{LC} \cdot d_{LC} = 1.9$ μm, $R_{Film} = 1.985$ μm, $\phi_{P1} = 10°$, $\phi_{LC1} = -35°$, $\phi_{LC2} = 35°$, $\Omega_{LC} = 250°$, $\phi_F = 125°$, and $\phi_{P2} = 80°$. When a change of the viewing angle of the optical property is measured while changing the Z coefficient $Q_z$ of polycarbonate polymer film 18 in a range between 0.1 and 0.8, it was confirmed that the amount of contrast change, change of rate of reflection, and change of color become less in comparison with those of an ordinary type of color liquid crystal display device having $Q_z = 1.0$, $(n_y = n_z)$. Therefore the optical property is improved.

In the present embodiment of this invention, polycarbonate was used as a polymer film 18. However, the present invention should not be construed as being restricted thereto. Polyalylate or polysulphone may be used.

In the present embodiment of this invention, a diffusion type aluminum reflector was used as a reflector 17. However, the present invention should not be construed as being restricted thereto. For example, a silver reflector may be used. Further, the present invention can be applied to a transmission type of color liquid crystal display device in which back light module is provided instead of a reflector 17.

(A Second Embodiment)

Figure 4:
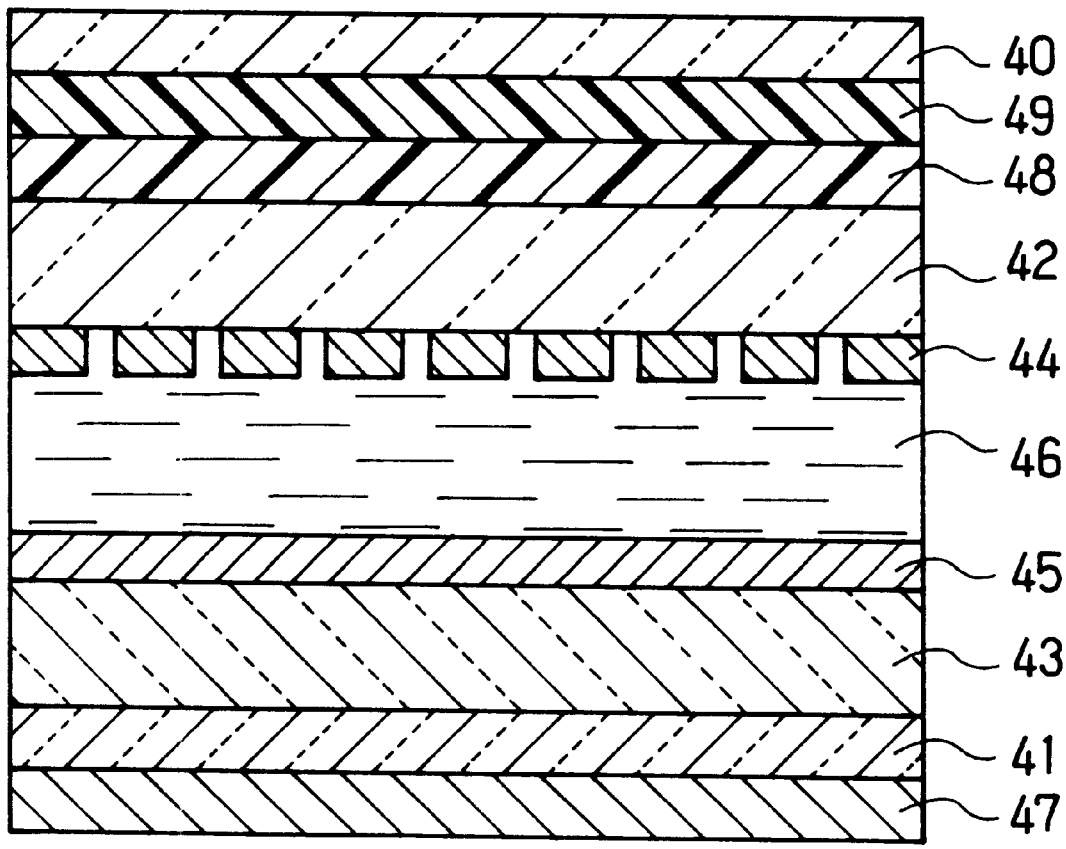
FIG. 4 is a sectional view showing a color liquid crystal display device in a second, third and fourth embodiment of the present invention.

FIG. 4 is a sectional view showing a color liquid crystal display device of a second embodiment of the present invention. As shown in FIG. 4, a plurality of stripe-shaped transparent electrodes 44 are formed parallel to each other and with a predetermined space therebetween on a transparent substrate 42. Further, a plurality of stripe-shaped transparent electrodes 45 are formed parallel to each other and with a predetermined space therebetween on a transparent substrate 43. The transparent substrates 42 and 43 are arranged parallel to each other with the transparent electrodes 44 and 45 facing each other. In this case, the transparent electrodes 44 and 45 are arranged to form a matrix. A liquid crystal layer 46 is formed between the transparent substrate 42 with which the transparent electrode 44 is formed and the transparent substrate 43 with which the transparent electrode 45 is formed. Polymer films 48 and 49 are formed sequentially on the transparent substrate 42 at the side opposite to the side where the transparent electrode 44 is formed. Further, a polarization film 40 is formed on the polymer film 49. A polarization film 41 is formed on the transparent substrate 43 at the side opposite to the side where the transparent electrode 45 is formed. Further, a reflector 47 is provided on the polarization film 41.

Figure 5:
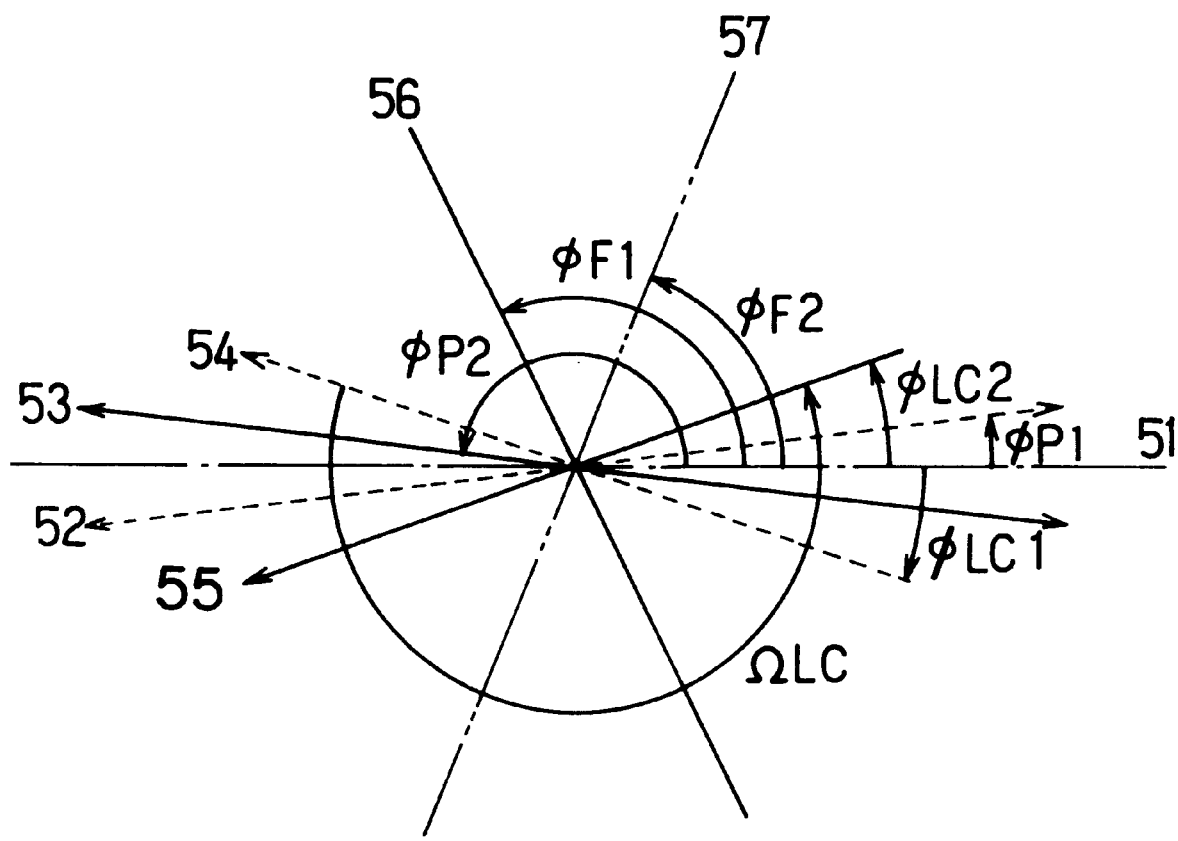
FIG. 5 is a view illustrating the optical properties of a color liquid crystal display device in a second, third and fourth embodiment of the present invention.

FIG. 5 illustrates the optical properties of optical components of a color liquid crystal display device of a second embodiment of the present invention. In FIG. 5, 51 indicates a base line, 52 indicates the absorption axis direction of the polarization film 41 positioned at the lower side, 53 indicates an absorption axis direction of the polarization film 40 positioned at the upper side, 54 indicates the orientation direction of the liquid crystal molecule on the transparent substrate 43 positioned at the lower side, 55 indicates the orientation direction of liquid crystal molecule on the transparent substrate 42 positioned at the upper side, 56 indicates the retardation axis direction (the direction of extraordinary refractive index) of the polymer film 48 formed at the side of the liquid crystal layer 46 and 57 indicates the retardation axis direction (the direction of extraordinary refractive index) of the polymer film 49 formed at the side of the polarization film 40.

$\phi_{P1}$ indicates the angle between the absorption axis direction 52 of the polarization film 41 positioned at the lower side and the base line 51 when the twist direction of the liquid crystal is positive. $\phi_{P1}$ indicates the angle between the absorption axis direction 53 of the polarization film 40 positioned at the upper side of the transparent substrate and the base line 51 when the twist direction of the liquid crystal is positive. $\phi_{LC1}$ indicates the angle between the orientation direction 54 of the liquid crystal molecule on the transparent substrate 43 positioned at the lower side and the base line 51 when the twist direction of the liquid crystal is positive. $\phi_{LC2}$ indicates the angle between the orientation direction 55 of the liquid crystal molecule on the transparent substrate 42 positioned at the upper side and the base line 51 when the twist direction of the liquid crystal is positive. $\phi_{F1}$ indicates the angle between the retardation axis direction 56 of the polymer film 48 and the base line 51 when the twist direction of the liquid crystal is positive. $\phi_{F2}$ indicates the angle between the retardation axis direction 57 of the polymer film 49 and the base line 51 when the direction of the liquid crystal is positive. $\Omega_{LC}$ indicates the twist direction and twist angle of the liquid crystal.

Next, a method of manufacturing a color liquid crystal display device having the above-mentioned construction will be explained. 5 wt % polyimide solution (the solvent is N-methyl-2-pyrrolidine) is printed on a transparent substrate 42 and 43 (glass substrate) on which stripe-shaped transparent electrodes 44 and 45 composed of oxide of indium and tin are formed respectively. Then the polyimide solution is hardened at 200° C. and orientation treatment is carried out by the rotation rubbing method using rayon cloth to obtain a predetermined twist angle.

Next, a thermo-setting seal resin containing 1.0 wt % of glass fiber having a predetermined diameter is printed on the periphery of the top surface of transparent substrate 42 and resin beads having a predetermined diameter are spread on the transparent substrate 43 at a ratio of 150 pieces/mm². The transparent substrates 42 and 43 are adhered together so as to form a matrix configuratin with stripe-shaped transparent electrodes 44 and 45, and then the seal resin is hardened at 150° C. to manufacture a cell container. In this case, the cell container has a filling portion for filling liquid crystal material. Next, air in the cell container is evacuated while the liquid crystal material is deaerated. Then liquid crystal, which is obtained by mixing a predetermined chiral liquid crystal with tolane nematic liquid crystal having a birefringence $\Delta n_{LC} = 0.25$ is filled in the cell container, that is, the space between the transparent substrate 42 and 43. Then, the filling portion of the cell container is sealed with ultraviolet ray hardening resin, and the ultraviolet ray hardening resin is hardened by irradiation with ultraviolet ray.

Next, polycarbonate as polymer films 48 and 49 are adhered to the surface of the transparent substrate 42 opposite to the surface where the transparent electrode 44 is formed, and then a neutral gray polarization film (for example, NPF-F1025DU manufactured by NITTO DENKO (K.K.)) is adhered as a polarization film 40 to the polymer film 49. Lastly, a neutral gray polarization film (for example, NPF-F1025DU manufactured by NITTO DENKO (K.K.)) is adhered as a polarization film 41 to the surface of the transparent substrate 43 opposite to the surface where the transparent electrode 45 is formed. Then a diffusion type aluminum reflector is adhered to the polarization film as a reflector 47. According to the above-mentioned procedure, a reflective type of color liquid crystal display device was obtained.

The values of the display device are set as follows. $\phi_{P1}10°$, $\phi_{LC1}=35°$, $\phi_{LC2}=35°$, $\Omega_{LC}=250°$, $\phi_{F1}=124.5°$, $\phi_{F2}=136°$ and $\phi_{P2}=93°$. $\Delta n_{LC}$ indicates the birefringence of nematic liquid crystal, $d_{LC}$ indicates the thickness of liquid crystal layer 46, $n_x$ (1) indicates the extraordinary refractive index of polymer film 48 positioned at the side of the liquid crystal layer 46, $n_y$ (1) indicates the ordinary refractive index of polymer film 48, 46, $d_{Film}$ (1) indicates the thickness of a polymer film 48, $R_{Film}$ (1) indicates the retardation of polymer film 48, that is, $R_{Film}(1)=\{n_x(1)-n_y(1)\}\cdot d_{Film}(1)$. $n_x$ (2) indicates the extraordinary refractive index of polymer film 49 positioned at the side of the polarization film 40 positioned at the upper side, $n_y$ (2) indicates the ordinary refractive index of polymer film 49, $d_{Film}$ (2) indicates the thickness of polymer film 49, $R_{Film}$ (2) indicates retardation of polymer film 49, that is, $R_{Film}(2)=\{n_x(2)-n_y(2)\}\cdot d_{Film}(2)$ and $\Delta(R)$ indicates birefringence difference.

When an optical property of the reflective type of color liquid crystal display device is measured by changing $\Delta n_{LC}\cdot d_{LC}$ while satisfying $\Delta(R)=(R_{Film}(1)+R_{Film}(2))-\Delta n_{LC}\cdot d_{LC}=0.086$ $\mu$m, a preferable black and white display and a preferable red display were obtained when $\Delta n_{LC}\cdot d_{LC}$ is in a range between 1.2$\mu$m and 2.2 $\mu$m. This is due to the fact that the color display is changed by using a birefringence of liquid crystal layer 46. Therefore the color change from white to black, green and red can be conducted with high color purity by making the birefringence of the liquid crystal layer 46 more than a certain amount.

When the birefringence difference, $\Delta(R)$, satisfies a range between 0.0 $\mu$m and 0.1 $\mu$m, both of the white display and black display are achromatic color. When voltage is applied between transparent electrodes 44 and 45, it was confirmed that the display color is changed from white to black, green and red. That is, when the birefringence difference, $\Delta(R)$, is in a range between 0.0 $\mu$m and 0.1 $\mu$m, $\phi_{F1}-\phi_{LC2}$ satisfies 90° ±10°, and $\phi_{F2}-\phi_{F1}$ satisfies 0° ±25°, white can be changed to be black in achromatic color where the birefringence of liquid crystal layer 46 and polymer film 48 and 49 are cancelled when a voltage is changed in a range of low voltage.

When $\phi_{LC1}-\phi_{P1}$ and $\phi_{P2}-\phi_F$ satisfy ±45° ±10°, color purity and efficiency for light utilization can be increased. This is due to the fact that when an angle between the direction of absorption axis 52 of the polarization film 41 formed at a lower side and the orientation direction 54 of the liquid crystal molecule on the transparent substrate 43 formed at a lower side or an angle between the direction of the absorption axis 53 of the polarization film 40 formed at the upper side and the retardation axis direction 57 of the polymer film 49 is 0° or 90°, efficiency for light utilization becomes 0 and when the above-mentioned angle is 45°, efficiency for light utilization becomes maximum.

The twist angle of the liquid crystal affects the duty ratio, that is, the reciprocal of the possible number of selective electrodes to be used when a simple matrix color liquid crystal display device is driven. When the twist angle becomes larger and larger, the duty ratio can be reduced more and more, and as a result, the number of selective electrodes can be increased. Therefore, the number of pixels can be increased. In a second embodiment of the present invention, the display color is changed from white to black, green and red as the applied voltage increases. When the twist angle is in a range between 220° to 260°, it was confirmed that even a red display can be obtained by driving a color liquid crystal display device at a duty ratio less than 1/64.

When $\Delta n_{LC}\cdot d_{LC}$ is in a range between 1.5 $\mu$m and 2.0 $\mu$m, and the twist angle is set in a range between 240° to 260°, it was confirmed that even a red display can be obtained by driving a color liquid crystal display device at a duty ratio less than 1/200.

A result of measured optical property in which $n_{LC}\cdot d_{LC}=1.6$ $\mu$m, $R_{Film}(1)=0.392$ $\mu$m, $R_{Film}(2)=1.294$ $\mu$m, $\phi_{P1}=10°$, $\phi_{LC1}=-35°$, $\phi_{LC2}=35°$, $\Omega LC=250°$, $\phi_{F1}=124.5°$, $\phi_{F2}=136°$ and $\phi_{P2}=93°$ is shown.

In this case, $\Delta(R)=(R_{Film}(1)+R_{Film}(2))-\Delta n_{LC}\cdot d_{LC}=0.0869$ $\mu$m, $\phi_{F1}-\phi_{LC2}=89.5°$, $\phi_{F2}-\phi_{F1}=11.5°$ $\phi_{LC1}-\phi_{P1}=-45°$ and $\phi_{P2}-\phi_{F2}=-43°$. Therefore, it satisfies the above-mentioned conditions.

Figure 6:
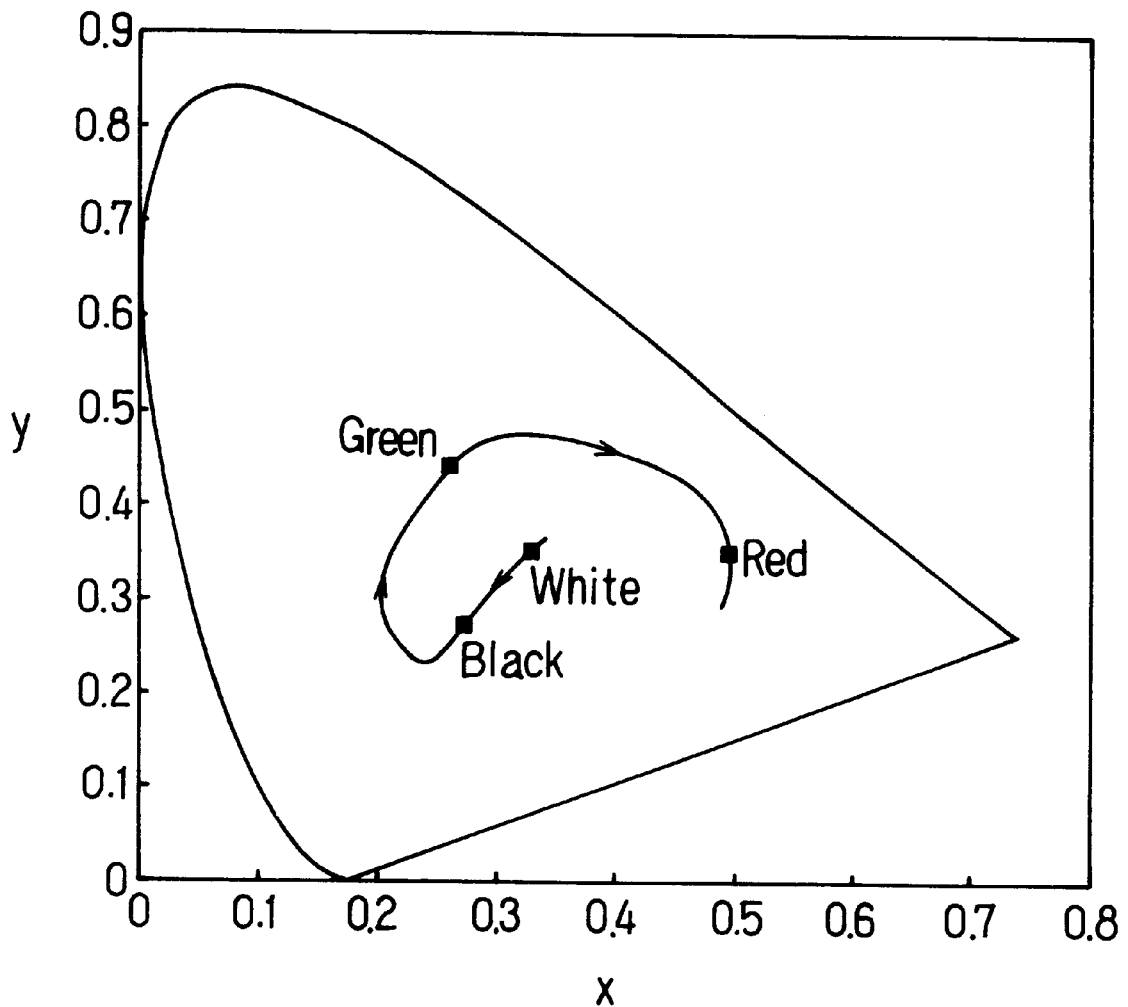
FIG. 6 is a chromaticity diagram showing a color change of a color liquid crystal display device in a second embodiment of the present invention.

In this case, it is possible to use a display color which changes from white to black, green and red by driving a color liquid crystal display device at a duty ratio of 1/240. FIG. 6 shows the transition of color change. In FIG. 6, the horizontal axis indicates x component of chromaticity coordinate and the vertical axis indicates y component of chromaticity coordinate. Table 2 below shows the ratio of reflection of each display color and a value of xy chromaticity coordinates (CIE1931).

TABLE 2

| color | rate of reflection (%) | chromaticity coordinate | | contrast white/black |
|---|---|---|---|---|
| | | x | y | |
| white | 21.8 | 0.328 | 0.353 | 5.2 |
| black | 4.2 | 0.271 | 0.280 | — |
| green | 15.5 | 0.259 | 0.443 | — |
| red | 15.0 | 0.494 | 0.351 | — |

With the above-mentioned construction, it was confirmed that a reflective type color liquid crystal display device that can express a black and white display in achromatic color with contrast of 5 or more, and a red display with high color purity can be obtained.

The values of the display device are set as follows. $\Delta n_{LC}\cdot d_{LC}=1.6$ $\mu$m, $R_{Film}(1)=0.392$ $\mu$m, $R_{Film}(2)=1.294$ $\mu$m, $\phi_{P1}=10°$, $\phi_{L C1}=35°$, $\phi_{LC2}=35°$, $\Omega_{LC}=250°$, $\phi_{F1}=124.5°$, $\phi_{F2}=136.5°$ and $\phi_{P2}=93°$. When a change of the viewing angle of the optical property is measured while changing the Z coefficient $Q_z$ of polycarbonate polymer film 48 and 49 in a range between 0.1 and 0.8, it was confirmed that the amount of contrast change, change of rate of reflection, and change of color become less in comparison with those of an ordinary type of color liquid crystal display device having $Q_z=1.0$, ($n_y=n_z$). Therefore, the optical property is improved.

In the present embodiment of this invention, polycarbonate was used as polymer films 48 and 49. However, the present invention should not be construed as being restricted thereto. Polyalylate or polysulfane may be used.

In the present embodiment of this invention, a diffusion type aluminum reflector was used as a reflector 47. However, the present invention should not be construed as being restricted thereto. For example, a silver reflector may be used. Further, the present invention can be applied to a transmission type of color liquid crystal display device in which back light module is provided instead of a reflector.

(A Third Embodiment)

A method of manufacturing and construction of a color liquid crystal device of the third embodiment of the present invention are common to those of the second embodiment in this invention. Therefore FIG. 4 and FIG. 5 showing the color liquid crystal device in the second embodiment are used to explain a color liquid crystal device in the third embodiment.

The values of the display device are set as follows. $\phi_{P1}10°$, $\phi_{LC1}=35°$, $\phi_{LC2}=35°$, $\Omega_{LC}=250°$, $\phi_{F1}=133.5°$, $\phi_{F2}=120.5°$ and $\phi_{P2}=174°$.

When an optical property of the reflective type of color liquid crystal display device is measured by changing $\Delta n_{LC} \cdot d_{LC}$ while satisfying $\Delta(R)=(R_{Film}(1)+R_{Film}(2))-\Delta n_{LC} \cdot d_{LC}=-0.15$ μm, a preferable black and white display and a preferable red display were obtained when $\Delta n_{LC} \cdot d_{LC}$ is in a range between 1.2 μm and 2.2 μm. This is due to the fact that the color display is changed by using a birefringence of liquid crystal layer 46. Therefore the color change from white to black, green and red can be conducted with high color purity by making the birefrigence of the liquid crystal layer 46 more than a certain amount.

When the birefringence difference, $\Delta(R)$, satisfies a range between −0.1 μm and −0.2 μm, both of the white display and black display are achromatic color. When an voltage is applied between transparent electrodes 44 and 45, it was confirmed that the display color is changed from white to black, green and red. That is, when the birefringence difference, $\Delta(R)$, is in a range between −0.1 μm and −0.2 μm, $\phi_{F1}-\phi_{LC2}$ satisfies 90° ±10°, and $\phi_{F2}-\phi_{F1}$ satisfies 0° ±25°, white can be changed to be black in achromatic color where the birefringence of liquid crystal layer 46, polymer film 48 and 49 are cancelled when a voltage is changed in a range of low voltage.

When $\phi_{LC1}-\phi_{P1}$ and $\phi_{P2}-\phi_{F2}$ satisfy ±45° ±10°, colour purity and efficiency for light utilization can be increased. This is due to the fact that when an angle between the direction of absorption axis 52 of the polarization film 41 positioned at the lower side and the orientation direction 54 of the liquid crystal molecule on the transparent substrate 43 positioned at the lower side or an angle between the direction of the absorption axis 53 of the polarization film 40 positioned at the upper side and the retardation axis direction 26 of the polymer film 18 is 0° or 90°, efficiency for light utilization becomes 0 and when the above-mentioned angle is 45°, efficiency for light utilization becomes maximum.

The twist angle of the liquid crystal affects the duty ratio, that is, the reciprocal of the possible number of selective electrodes to be used when a simple matrix color liquid crystal display device is driven. When the twist angle becomes larger and larger, the duty ratio can be reduced more and more, and as a result, the number of selective electrodes can be increased, therefore, a number of pixels can be increased. In a third embodiment of the present invention, the display color is changed from white to black, green and red as the applied voltage increases. When the twist angle is in a range between 220° and 260°, it was confirmed that even a red display can be obtained by driving a color liquid crystal display device at a duty ratio less than 1/64.

When $\Delta n_{LC} \cdot d_{LC}$ is in a range between 1.5 μm and 2.0 μm, and the twist angle is in a range between 240° to 260°, it was confirmed that the color liquid crystal display device can be driven at a duty ratio less than 1/200.

A result of measured optical property in which $n_{LC} \cdot d_{LC}=1.7$ μm, $R_{Film}(1)=0.790$ μm, $R_{Film}(2)=0.760$ μm, $\phi_{P1}=10°$, $\phi_{LC1}=-35°$, $\phi_{LC2}=35°$, $\Omega_{LC}=250°$, $\phi_{F1}=133.5°$ and $\phi_{P2}=174°$ is shown.

In this case, $\Delta(R)=(R_{Film}(1)+R_{Film}(2))-\Delta n_{LC} \cdot d_{LC}=-0.15$ μm, $\phi_{F1}-\phi_{LC2}=98.5°$, $\phi_{F2}-\phi_{F1}=-13°$, $\phi_{LC1}-\phi_{P1}=-45°$ and $\phi_{P2}-\phi_{F2}=53.5°$. Therefore, it satisfies the above-mentioned conditions.

Figure 7:
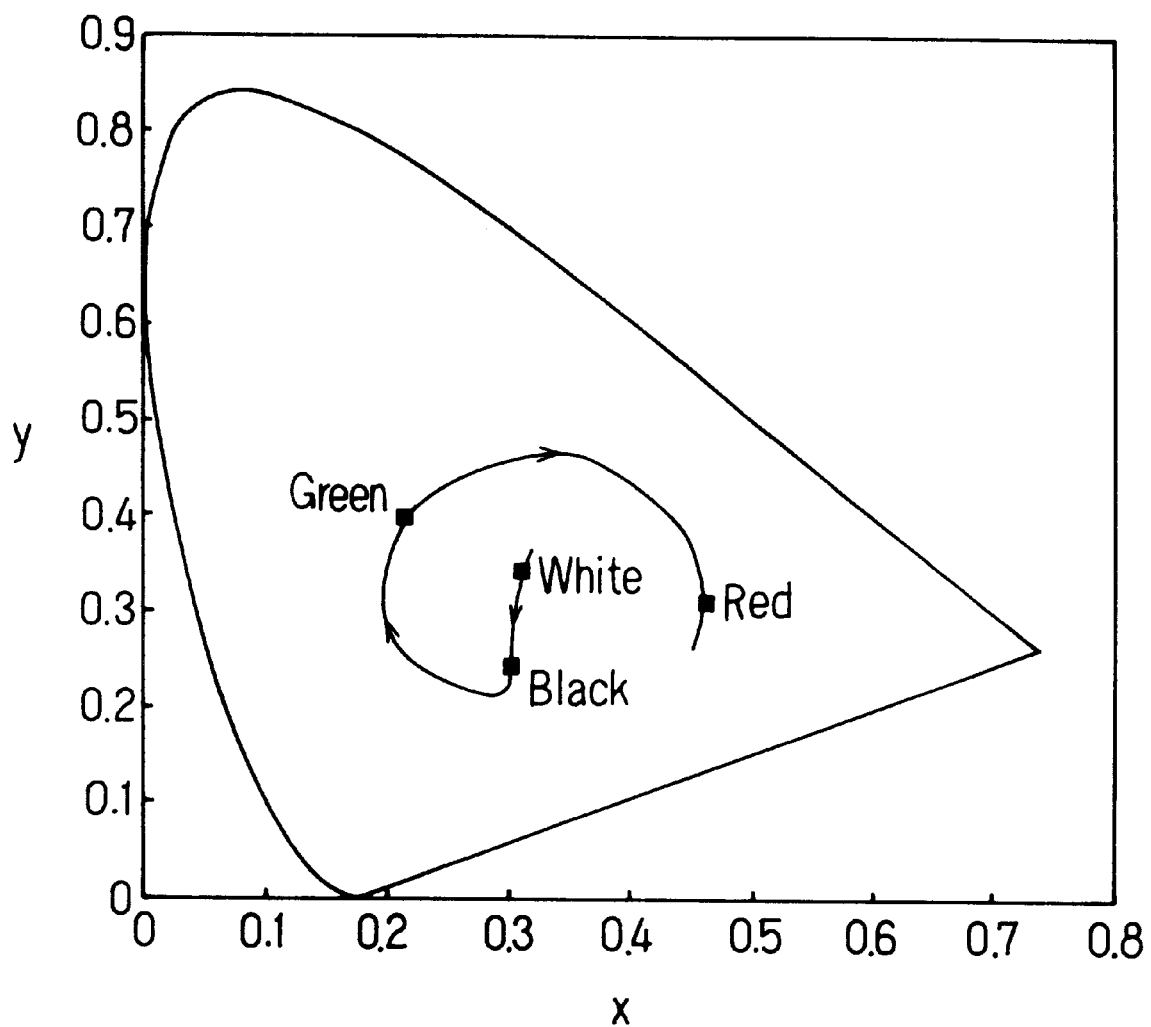
FIG. 7 is a chromaticity diagram showing a color change of a color liquid crystal display device in a third embodiment of the present invention.

In this case, it is possible to use a display color which changes from white to black, green and red by driving a color liquid crystal display device at a duty ratio of 1/240. FIG. 7 shows the transition of color change. In FIG. 7, the horizontal axis indicates x component of chromaticity coordinate and the vertical axis indicates y component of chromaticity coordinate. Table 3 shows the ratio of reflection of each color display and a value of xy chromaticity coordinates (CIE1931).

TABLE 3

| color | rate of reflection (%) | chromaticity coordinate | | contrast white/ black |
|---|---|---|---|---|
| | | x | y | |
| white | 20.1. | 0.310 | 0.341 | 5.7 |
| black | 3.5 | 0.300 | 0.243 | — |
| green | 15.3 | 0.212 | 0.399 | — |
| red | 15.1 | 0.460 | 0.312 | — |

With the above-mentioned construction, it was confirmed that a reflective type color liquid crystal display device that can express a black and white display in achromatic color with contrast of 5 or more, and a red display with high color purity can be obtained.

The values of the display device are set as follows. $\Delta n_{LC} \cdot d_{LC}=1.7$ μm, $R_{Film}(1)=0.7908$ μm, $R_{Film}(2)=0.760$ μm, $\phi_{P1}=10°$, $\phi_{LC1}=-35°$, $\phi_{LC2}=35°$, $\Omega_{LC}=250°$, $\phi_{F1}=125°$, $\phi_{F2}=120.5°$ and $\phi_{P2}=174°$. When a change of the viewing angle of the optical property is measured while changing the Z coefficient $Q_z$ of polycarbonate polymer films 48 and 49 in a range between 0.1 and 0.8, it was confirmed that the amount of contrast change, change of rate of reflection, and change of color become less in comparison with an ordinary type of the color liquid crystal device having $Q_z=1.0$, ($n_y=n_z$). Therefore, the optical property is improved.

In the present embodiment of this invention, polycarbonate was used as a polymer film 48 and 49. However, the present invention should not be construed as being restricted thereto. Polyalylate or polysulphone may be used.

In the present embodiment of this invention, an aluminum diffusion reflector was used as a reflector 47. However, the present invention should not be construed as being restricted thereto. For example, a silver reflector may be used. Further, the present invention can be applied to a transmission type in which back light module is provided instead of a reflector 47.

(A Fourth Embodiment)

A method of manufacturing and construction of a color liquid crystal device of the fourth embodiment of this invention are common to those of the second embodiment and the third embodiment in this invention. Therefore FIG. 4 and FIG. 5 showing a color liquid crystal device in a second and third embodiment are used to explain a color liquid crystal device in the fourth embodiment.

The values of the display device are set as follows. $\phi_{P1}=10°$, $\phi_{LC1}=-35°$, $\phi_{LC2}=35°$, $\Omega_{LC}=250°$, $\phi_{F1}=130.5°$, $\phi_{F2}=82.5°$ and $\phi_{P2}=10°$.

When an optical property of the reflective type of color liquid crystal display device is measured by changing $\Delta n_{LC} \cdot d_{LC}$ while satisfying $\Delta(R)=(R_{Film}(1)+R_{Film}(2))-\Delta n_{LC} \cdot d_{LC}=0.594$ μm, a preferable black and white display and a preferable red display were obtained when $\Delta n_{LC} \cdot d_{LC}$ is in a range between 1.2 μm and 2.2 μm. This is due to the fact that a color display is changed by using a birefringence of liquid crystal layer 46. Therefore the color change from white to black, green and red can be conducted with high color purity by making the birefrigence of the liquid crystal layer 46 more than a certain amount.

When $\Delta(R)$ satisfies a range of between 0.5 μm and 1.0 μm, both of the white display and black display are achromatic color. When voltage is applied between transparent electrodes 44 and 45, it was confirmed that the display color is changed from white to black, green and red. That is, when $\Delta(R)$ is in a range between 0.5 μm and 1.0 μm, $\phi_{F1}-\phi_{LC2}$ satisfies 90° ±10° and $\phi_{F2}-\phi_{F1}$ satisfies 45° ±25°, white can be changed to be black in achromatic color where the birefringence of liquid crystal layer 46, polymer film 48 and 49 are cancelled at a low voltage.

When $\phi_{LC1}-\phi_{P1}$ and $\phi_{P2}-\phi_{F2}$ satisfy ±45° ±10°, colour purity and efficiency for light utilization can be increased. This is due to the fact that when an angle between the direction of absorption axis 52 of the polarization film 41 positioned at the lower side and the orientation direction 54 of the liquid crystal molecule on the transparent substrate 43 positioned at the lower side or an angle between the direction of the absorption axis 53 of the polarization film 40 positioned at the upper side and the retardation axis direction 26 of the polymer film 18 is 0° or 90°, efficiency for light utilization becomes 0 and when the above-mentioned angle is 45°, efficiency for light utilization becomes maximum.

The twist angle of liquid crystal affects the duty ratio, that is, the reciprocal of the possible number of selective electrodes to be used when a simple matrix color liquid crystal display device is driven. When the twist angle becomes larger and larger, the duty ratio can be reduced more and more, and as a result, the number of pixels can be increased. In the present embodiment of this invention, a color is changed from white to black, green and red as the applied voltage increases. When the twist angle is in a range between 220° to 260°, it was confirmed that even a red display can be obtained by driving a color liquid crystal display device at a duty ratio less than 1/64.

When $\Delta n_{LC} \cdot d_{LC}$ is in a range between 1.5 μm and 2.0 μm, and the twist angle is in a range between 240° to 260°, it was confirmed that the color liquid crystal display device can be driven at a duty ratio less than 1/200.

A result of measured optical property in which $n_{LC} \cdot d_{LC}=1.9$ μm, $R_{Film}(1)=1.734$ μm, $R_{Film}(2)=0.760$ μm, $\phi_{P1}=10°$, $\phi_{LC1}=35°$, $\phi_{LC2}=35°$, $\Omega_{LC}=250°$, $\phi_{F1}=130.5°$, $\phi_{F1}=82.5°$ and $\phi_{P2}=10°$ is shown.

In this case, $\Delta(R)=(R_{Film}(1)+R_{Film}(2))-\Delta n_{LC} \cdot d_{LC}=0.594$ μm, $\phi_{F1}-\phi_{LC2}=95.5°$, $\phi_{F2}-\phi_{F1}=-48°$ and $\phi_{LC1}-\phi_{P1}=-45°$. Therefore, it satisfies the above-mentioned conditions.

Figure 8:
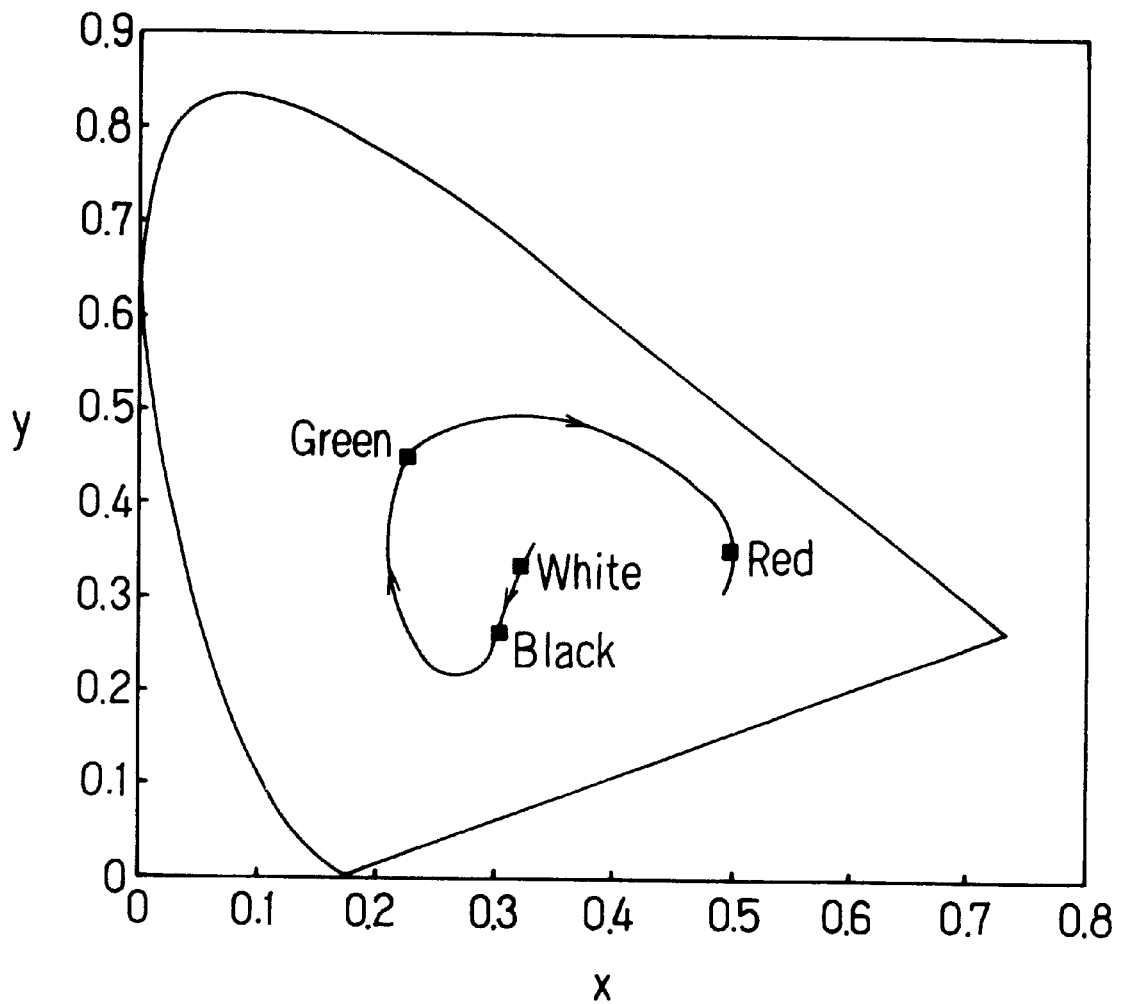
FIG. 8 is a chromaticity diagram showing a color change of a color liquid crystal display device in a fourth embodiment of the present invention.

It is possible to use color which changes from white to black, green and red at a duty ratio of 1/240. FIG. 8 shows the transition of color change. In FIG. 8, the horizontal axis indicates x component of chromaticity coordinate and the vertical axis indicates y component of chromaticity coordinate. Table 4 shows the ratio of reflection of each color display and a value of xy chromaticity coordinates (CIE1931).

TABLE 4

| color | rate of reflection (%) | chromaticity coordinate x | y | contrast white/black |
|---|---|---|---|---|
| white | 20.6 | 0.322 | 0.338 | 5.9 |
| black | 3.5 | 0.302 | 0.265 | — |
| green | 15.6 | 0.224 | 0.452 | — |
| red | 15.1 | 0.494 | 0.353 | — |

With the above-mentioned construction, it was confirmed that a reflective type color liquid crystal display device that can express a black and white display in achromatic color with contrast 5 or more, and a red display with high color purity can be obtained.

The values of the display device are set as follows. $\Delta n_{LC} \cdot d_{LC}=1.9$ μm, $R_{Film}(1)=1.734$ μm, $R_{Film}(2)=0.760$ μm, $\phi_{P1}=10°$, $\phi_{LC1}=-35°$, $\phi_{LC2}=35°$, $\Omega_{LC}=250°$, $\phi_{F1}=130.5°$, $\phi_{F1}=82.5°$ and $\phi_{P2}=10°$.

When a change of the viewing angle of the optical property is measured while changing the Z coefficient $Q_z$ of polycarbonate polymer films 48 and 49 in a range between 0.1 and 0.8, it was confirmed that the amount of contrast change, change of rate of reflection, and change of color become less in comparison with an ordinary type of color liquid crystal display device having $Q_z=1.0$, ($n_y=n_z$). Therefore, the viewing angle of optical property is improved.

In the present embodiment of this invention, polycarbonate was used as a polymer film 48 and 49. However, the present invention should not be construed as being restricted thereto. Polyalylate or polysulphone may be used.

In the present embodiment of this invention, a diffusion type aluminum reflector was used as a reflector 47. However, the present invention should not be construed as being restricted thereto. For example, a silver reflector may be used. Further, the present invention can be applied to a transmission type of color liquid crystal display device in which back light module is provided instead of a reflector 47.

This invention may be embodied in other specific forms without departing from the spirit or essential characteristics thereof. The embodiments disclosed in this application are to be considered in all respects as illustrative and not restrictive, the scope of the invention being indicated by the appended claims rather than by the foregoing description, an all change which come within the meaning and range of equivalency of the claims are intended to be embraced therein.

What is claimed is:

1. A color liquid crystal display device comprising:

a liquid crystal cell comprising nematic liquid crystal which is filled between a pair of transparent substrates, on whose innersides transparent electrodes are provided;

two polymer films positioned on one side of said liquid crystal cell;

and a pair of polarization films positioned on both sides, by which said liquid crystal cell and said polymer film are sandwiched, wherein the twist angle of said nematic liquid crystal cell is between 220° and 260°, $\Delta n_{LC} d_{LC}$ is the product of (a) birefringence of the nematic liquid crystal ($\Delta n_{LC}$) and (b) a thickness of the liquid crystal layer ($d_{LC}$), and $\Delta n_{LC} d_{LC}$ is between 1.2 μm and 2.2 μm, ($R_{Film}(1)+$ $R_{Film}(2))-\Delta n_{LC}d_{LC}$ is birefringence difference ($\Delta R$) and is defined by using (a) retardation of said polymer film ($R_{Film}(i)=(n_x(i)-n_y(i))\ d_{Film}(i)(i=1,2)$, wherein 1 indicates a polymer film positioned closer to said liquid crystal cell and 2 indicates another polymer film, $n_x(i)$ (i=1,2) indicates an extraordinary refractive rate of said polymer film, $n_y(i)(i=1,2)$ indicates an ordinary refractive rate of said polymer and $d_{Film}(i)(i=1,2)$ indicates a thickness of said polymer film) and (b) $\Delta n_{LC}d_{LC}$, and $\Delta R$ is between 0.5 μm and 1.0 μm.

2. The color liquid crystal display device as claimed in claim 1, wherein $\phi_{LC1}-\phi_{P1}$ satisfies ±45° ±10°, $\phi_{F1}-\phi_{LC2}$ satisfies 90° ±10°, and $\phi_{F2}-\phi_{F1}$ satisfies ±45° ±25°, when the color liquid crystal display device is viewed from the side on which two polymer films are positioned, the twist direction of the liquid crystal is designated as positive direction of rotation, an angle is measured using horizontal as a standard, the angle of the absorption axis direction of the polarization film positioned on the lower side is designated as $\phi_{p1}$, the angle of the direction of the liquid crystal molecule on the transparent substrate positioned on the lower side is designated as $\phi_{LC1}$, the angle of the direction of the liquid crystal molecule on the transparent substrate positioned on the upper side is designated as $\phi_{LC2}$ the angle of the direction of retardation axis of the polymer film positioned at a side of liquid crystal cell is designated as $\phi_{F1}$, the angle of the direction of retardation axis of the polymer film positioned at a side of the polarization film positioned at the side on which two polymer films are positioned is designated as $\phi_{F2}$ and the angle of the absorption axis direction of the polarization film positioned on the top side is designated as $\phi_{p2}$.

3. The color liquid crystal display device as claimed in claim 1, wherein the twist angle of the nematic liquid crystal is between 240° and 260°, the product of birefringence of the nematic liquid crystal, $\Delta n_{LC}$, and a thickness of crystal layer, $d_{LC}$, $\Delta n_{LC} \cdot d_{LC}$, is between 1.5 μm and 2.2 μm.

4. The color liquid crystal display device as claimed in claim 1, wherein $\Delta(R)$ is in a range between 0.55 μm and 0.65 μm, $\Delta n_{LC} \cdot d_{LC}$, is in a range between 1.8 μm and 2.0 μm, $R_{Film}(1)$ satisfies 1.7 μm±0.1 μm and $R_{Film}(2)$ satisfies 0.75 μm±0.1 μM.

5. The color liquid crystal display device as claimed in claim 1, wherein the polymer film is selected from a group consisting of polycarbonate, polyalylate and polysulphone.

6. The color liquid crystal display device as claimed in claim 1, wherein Z coefficient $Q_z=(n_{x-nz})/(n_x-n_y)$ is in a range between 0.1 and 0.8 which is defined by using $n_z$ which is an index of refraction, perpendicular to the surface of the polymer film.

7. The color liquid crystal display device as claimed in 1, wherein a reflector is provided on the outside of either one of the polarization films.

\* \* \* \* \*